United States Patent [19]
Warren

[11] Patent Number: 5,619,806
[45] Date of Patent: Apr. 15, 1997

[54] DRYING OF FIBER WEBS

[76] Inventor: David W. Warren, 9253 Glenoaks Blvd., Sun Valley, Calif. 91352

[21] Appl. No.: 605,519

[22] Filed: Feb. 26, 1996

[51] Int. Cl.$^6$ .................................................. F26B 3/00
[52] U.S. Cl. .............................. 34/331; 162/290; 34/344; 34/358; 34/419
[58] Field of Search ............................ 34/303, 330, 331, 34/344, 347, 335, 358, 373, 376, 379, 419, 95, 611, 618, 620, 406, 68, 92, 392; 162/100, 207, 290, 375

[56] References Cited

U.S. PATENT DOCUMENTS

| | | | |
|---|---|---|---|
| 1,860,431 | 5/1932 | Richter | 162/100 X |
| 2,760,410 | 8/1956 | Gillis | 34/406 |
| 3,284,285 | 11/1966 | Holden | 162/297 |
| 4,050,982 | 9/1977 | Bolliand et al. | 162/100 |
| 4,307,518 | 12/1981 | Izumo et al. | 34/331 |
| 4,324,613 | 4/1982 | Wahren | 162/111 |
| 4,899,461 | 2/1990 | Lehtinen | 34/392 |
| 5,389,204 | 2/1995 | Ampulski | 162/207 X |

OTHER PUBLICATIONS

Ahrens, F., and Astrom A., "High–Intensity Drying of Paper", Drying Technology (1986), pp. 245–270.
Lehtinen, Jukka, "A Versatile Web Drying and Consolidation Method Under Development", Paper and Timber, Apr. 1988, pp. 310–313.
Hartwell, Philip R. et al., "Different Approaches to Press Consolidation and Drying", Tappi Journal, Jan. 1989, pp. 63–66.
Cui, W.K. et al., "Drying of Paper—A Summary of Recent Developments", Tianjin Paper Co., Tianjin, China, pp. 292–295.

Primary Examiner—John M. Sollecito
Assistant Examiner—Steve Gravini
Attorney, Agent, or Firm—William W. Haefliger

[57] ABSTRACT

A process and an apparatus for high-intensity drying of fiber webs or sheets, such as newsprint, printing and writing papers, packaging paper, and paperboard or linerboard, as they are formed on a paper machine. The invention uses direct contact between the wet fiber web or sheet and various molten heat transfer fluids, such as liquified eutectic metal alloys, to impart heat at high rates over prolonged durations, in order to achieve ambient boiling of moisture contained within the web. The molten fluid contact process causes steam vapor to emanate from the web surface, without dilution by ambient air; and it is differentiated from the evaporative drying techniques of the prior industrial art, which depend on the uses of steam-heated cylinders to supply heat to the paper web surface, and ambient air to carry away moisture, which is evaporated from the web surface. Contact between the wet fiber web and the molten fluid can be accomplished either by submersing the web within a molten bath or by coating the surface of the web with the molten media. Because of the high interfacial surface tension between the molten media and the cellulose fiber comprising the paper web, the molten media does not appreciably stick to the paper after it is dried. Steam generated from the paper web is collected and condensed without dilution by ambient air to allow heat recovery at significantly higher temperature levels than attainable in evaporative dryers.

30 Claims, 4 Drawing Sheets

DRYING OF FIBER WEBS

This invention was made with Government support under DOE/SBIR grant No. DE-FG03-95ER81982 awarded by the Department of Energy. The Government has certain rights in this invention.

BACKGROUND OF THE INVENTION

This invention relates generally to drying of paper-related web or sheet form materials; and more particularly, to process and apparatus for high-intensity drying of fiber webs, such as newsprint, printing and writing papers, packaging paper and paperboard, or linerboard, as they are formed on a paper machine.

Paper drying represents one of the most energy-intensive operations in the paper mill. The objective of the drying section is to remove residual moisture in the pressed sheet at an efficient production rate with minimum usage of steam. For most dryers in use today, this is accomplished by contacting the paper web against a series of steam-heated, rotating cylinders or drums which are contained inside a machine room, that is ventilated by ambient air, to remove sheet moisture. Heat for evaporating moisture comes from steam, which condenses on the inner surface of the dryer cylinders. Condensate formed inside the cylinders must be removed by complex siphons that are often prone to thermal losses due to steam blow-by.

The driving force for heat transfer to the paper web is related to the difference between the cylinder steam temperature and the web evaporation temperature, and is limited by several thermal resistances, which include the condensate layer formed on the inside surface of the cylinder, scale, which forms on both the internal and external surfaces of the cylinder, and an air layer, which forms between the cylinder surface and the paper web. Because of these thermal resistances, the dryer heat flux rate is typically limited to values of 3–5 pounds of steam evaporated per hour per square foot of total cylinder area (3–5 lb/ft$^2$/h) in the prior industrial art. These low heat flux rates result in the need for many expensive drying cylinders, which occupy a large space within the machine room.

Since the paper web temperature is generally kept below the ambient boiling point, vapor removal from the web is mass-transfer driven by the vapor partial pressure gradients between the sheet surface and the ventilation air. The paper web picks up sensible heat while in contact with the cylinder, and flashes off steam in the open draw between the top and bottom cylinders, causing the sheet to spontaneously cool, and therefore become ready to pick up sensible heat again.

To maintain sufficient partial pressure gradients, air humidity in the dryer spaces is controlled by passing large quantities of heated ventilation air through the machine room. This involves the use of expensive air handling equipment, such as fans, ducts, machine room hoods, and air heat exchangers. Because the ambient air is heated to the evaporation temperature, a 10%–25% loss in dryer thermal efficiency occurs and results in dryer steam consumption of typically over 1.5 pound steam per pound of water evaporated.

In the prior art, the paper web passes in a serpentine fashion over an array of rotating cylinder dryers, and a restraining felt is used to enhance contact between the paper web and the heated cylinder surfaces. Despite the use of restraining felts, the paper web contacts only a portion of the available cylinder dryer circumferential area. Because of the use of restraining felts, pockets are formed between the restraining felt and paper web which must be evenly ventilated to maximize evaporative drying rates and to minimize cross-directional (CD) property variations that otherwise result in operational and quality problems related to reel building, calendering, and converting. Restraining felts are prone to plugging by paper fibers and may require on-line cleaning. They also experience wear during the course of normal operation, which necessitates maintenance and periodic replacement of the felt materials.

The development of new drying apparatus for increasing drying rate has been an industry objective for several decades. It is now understood that higher drying rates can be achieved by subjecting the paper sheet to sufficiently intensive and prolonged heat input so as to boil moisture from the web. This method is known as high-intensity drying.

Several attempts have been made to achieve higher heat intensities for drying paper by increasing the temperature of the heat transfer surface, increasing the contact time of the web against the heat transfer surface, and/or increasing the applied compressive force of the web against the heat transfer surface. All of these attempts have exclusively relied on the use of a solid surface, such as a belt or press roll, to transfer heat to the paper web.

For instance, the "PIRA" press drying unit ("PIRA" 1987) was developed to simulate a long nip press operating at high temperature and at speeds up to 400 m/min. The machine relies on a tensioned steel belt to provide a maximum nip pressure of about 400 kPa over a length of 0.3 m. A press roll located underneath the belt can apply additional pressure over a short nip length (2.5 mm). A multiple-nip system (Garcia 1987) has been operated at speeds up to 400 m/min, and optimum nip pressures of between 200–300 pli. These systems provide means contacting the paper web against a heat transfer surface under high compressive forces and short contact time, but do not allow drying of the paper product to final reel specifications.

The Tampella "Condebelt" press (Lehtinen 1988) consists of two steel belts—one heated to 150° C. and the other cooled to less than 100° C. The wet web is placed against the hot belt, and water evaporates from the sheet and condenses on the cooler belt. Steam is confined behind the hot belt to supply heat to the paper web and to provide compressive force on the belt and the underlying paper web surface. The "Condebelt" press is capable of achieving increased contact times between the paper web and the heat transfer surface compared to nip press apparatus; but it suffers from engineering limitations, such as the availability of practical methods to seal the steam heat transfer fluid against a large and rapidly moving heat-transfer belt.

Each of these systems are limted by mechanical difficulties encountered when attempting to contact a high-temperature solid surface against a fast moving paper web; and the mechanical systems described above have not yet demonstrated the objective of achieving high-intensity drying at commercial machine speeds for the purpose of producing a dried paper product having the requisite final reel moisture specifications and mechanical qualities using a single drying apparatus of compact dimension, high thermal efficiency and low cost.

Nip press apparatus, which apply high-compressive forces to accomplish high-intensity impulse drying, appear to be limited by sheet delamination and loss of z-directional strength, which has been observed upon release of nip pressure. Nip presses provide inherently short contact drying times, typically less than 0.1 seconds, and are only applicable to the partial dewatering of the paper web, and thus must be coupled with other drying techniques to achieve final reel moisture specifications. Methods described in the literature involving use of heated and cooled belts with mechanical seals to confine the heating and cooling media on opposing sides of the belts do not appear to be commercially practical, due to problems associated with seal tolerances, wear and leakage.

There is need for process and apparatus that overcomes problems and limitations, as discussed above.

SUMMARY OF THE INVENTION

It is a major object of the invention to provide process and apparatus meeting the above need. Basically, the present invention overcomes limitations of the prior art by providing a practical method for achieving high-intensity drying in a dynamic commercial apparatus, using a molten media heat-transfer agent.

The present invention accomplishes high-intensity contact heat transfer to paper webs using molten heat transfer fluids, which are directly contacted against the web paper web surface. This is distinguished from prior efforts to effect high-intensity drying that relied on contact between the moist paper and the heated solid metal surfaces in the form of belts, cylinders, press rolls, or platens. The practical difficulties encountered using this approach have been described above.

The use of molten fluids as the contacting heat transfer media offers several advantages including:

a) the achievement of high contact heat transfer coefficients without the use of restraining felts or high compressive forces, due to the nature of the conformal interaction between molten fluid and the web surface;

b) the ability to achieve continuous and prolonged heat transfer contact times, typically 0.2 to 2.5 seconds, at high machine speeds, due to the inherent mechanical simplicity of the contacting method;

c) the ability to supply high temperature heat to the contact source (molten fluid) using a single heat exchanger or heater of conventional design, as opposed to supplying heat to many rotating drums;

d) and the ability to achieve two-sided heat transfer and drying.

Features of the invention that overcome limitations of prior processes include:

a) achieving high overall drying rate and high-thermal contact between the wet paper web and the heat transfer media without the use of restraining felts, b) achieving continuous contact between the paper web and the heat transfer media, thereby reducing dryer space requirements for a given contact area, c) avoiding the need for ventilation air to remove sheet moisture, thereby increasing the energy efficiency of the drying process and obviating the need for expensive air-handling equipment, d) and recovering moisture from the sheet in the form of pure steam, thereby allowing waste heat recovery to occur at significantly higher temperatures compared to conventional drying processes.

Further, the process of the invention provides for contacting the wet paper web against a molten heat-transfer media to effect high-intensity drying. High-intensity drying refers to drying at sufficiently intensive and prolonged heat input conditions, such that the moist paper web achieves internal temperatures in excess of the ambient boiling point. Under these conditions, vapor removal from the web is driven by total pressure gradients, resulting in bulk flow mechanisms which are significantly more rapid than diffusion-controlled evaporation mechanisms. The rapid bulk flow of steam vapor from the wet sheet may also promote the dewatering of moisture contained within the sheet, which is kinetically and energetically favorable compared to moisture removal by evaporation.

The invention is applicable to a wide range of sheet form materials, including but not limited to, paper webs, woven fabrics, textiles, polymer sheets, wood board, and various composite materials.

These and other objects and advantages of the invention, as well as the details of an illustrative embodiment, will be more fully understood from the following specification and drawings, in which:

DETAILED DESCRIPTION

Figure 1:
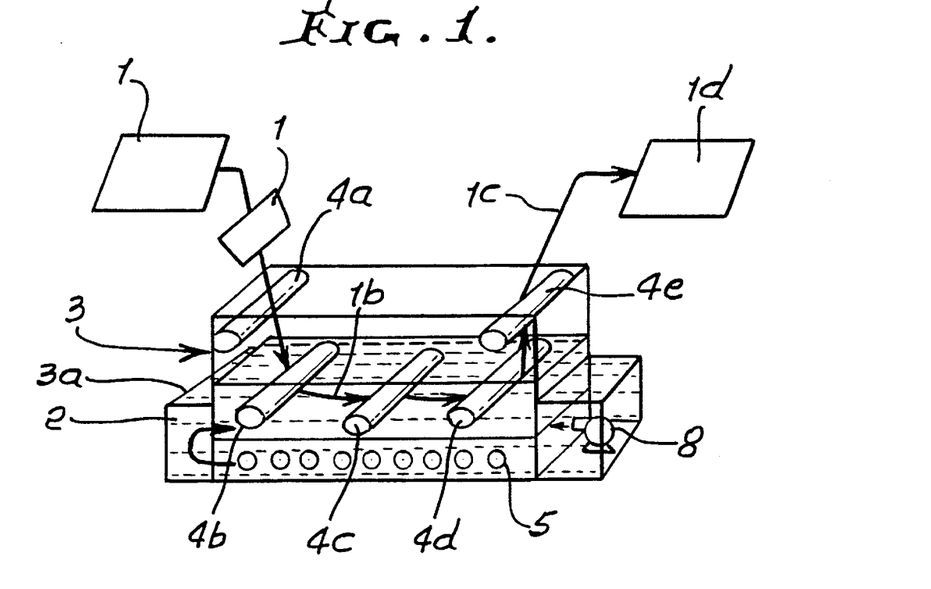
FIG. 1 is a general arrangement view of the preferred embodiment of the molten fluid contact drying process and apparatus involving direct contact of a wet paper web sheet with a molten fluid material contained within a bath, which is internally heated.

The preferred embodiment of the molten fluid contact drying process and apparatus is depicted in FIG. 1. A traveling, moist paper web 1 exits from or past a conventional press roll and is directed to a molten metal fluid bath 3 or a series of baths wherein it is submerged within the hot, molten fluid 2 by means of guide rolls 4a–4e. A container for the bath appears at 3a. The molten bath may be shallow and long, with the guide rolls oriented to effect motion of the submerged paper web in a predominantly horizontal manner, as at 1b; or the molten bath may be deep and narrow, with the guide rolls oriented to effect motion of the paper web in a predominantly vertical manner, or with a vertical component. The horizontal orientation is generally preferred, in order to maximize cross-sectional area available for escape of steam from the paper and molten bath.

The molten fluid is heated to a temperature in a range of typically 110° C. to 300° C. using tubes, plates or other heat-transfer surfaces 5, which are immersed within the fluid and which serve to confine and convey hot combustion products or pressurized steam, so as to accomplish the desired heat transfer objective. The molten fluid may be agitated by means of stirrers, pumps 8 or other devices to enhance circulation of the molten fluid over the heat transfer surface or surfaces of the traveling web, so as to maximize the rate of heat transfer from the surface to the fluid, and to ensure temperature uniformity within the molten bath. The web is guided by rolls 4d and 4e to upwardly exit the bath at 1c. The dry web is shown at 1d.

Figure 2:
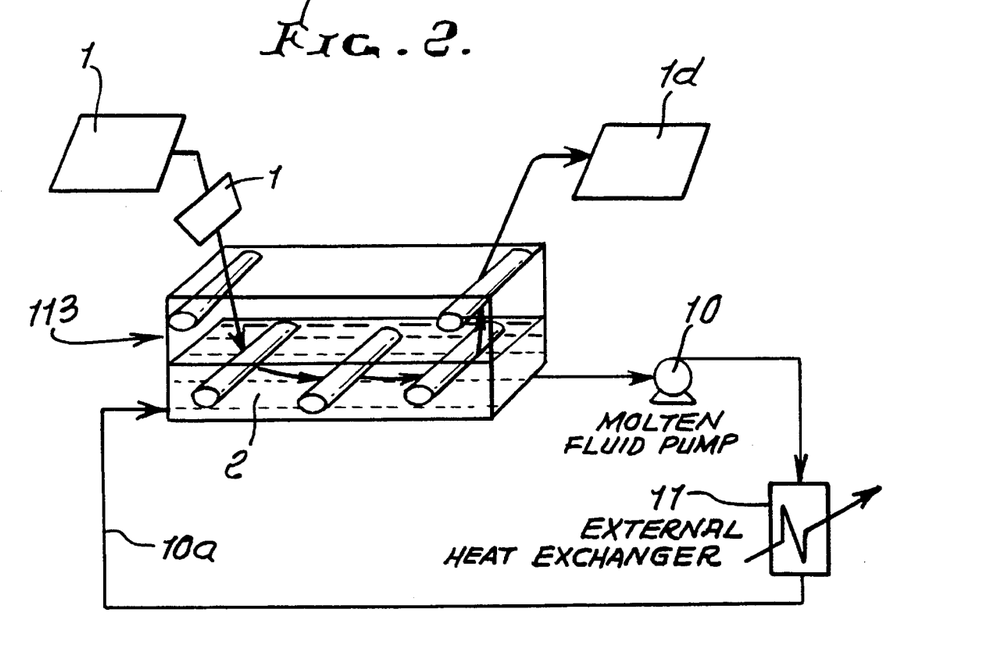
FIG. 2 is a general arrangement view of the molten fluid contact drying process and apparatus using an external heat exchanger.

Alternately, as shown in FIG. 2, the molten fluid may be pumped at 10 from the lower interior of the molten bath 113 through a heat exchange device 11, which is located external to the molten bath, and then returned at 10a to the molten bath at the desired temperature.

Figure 3:
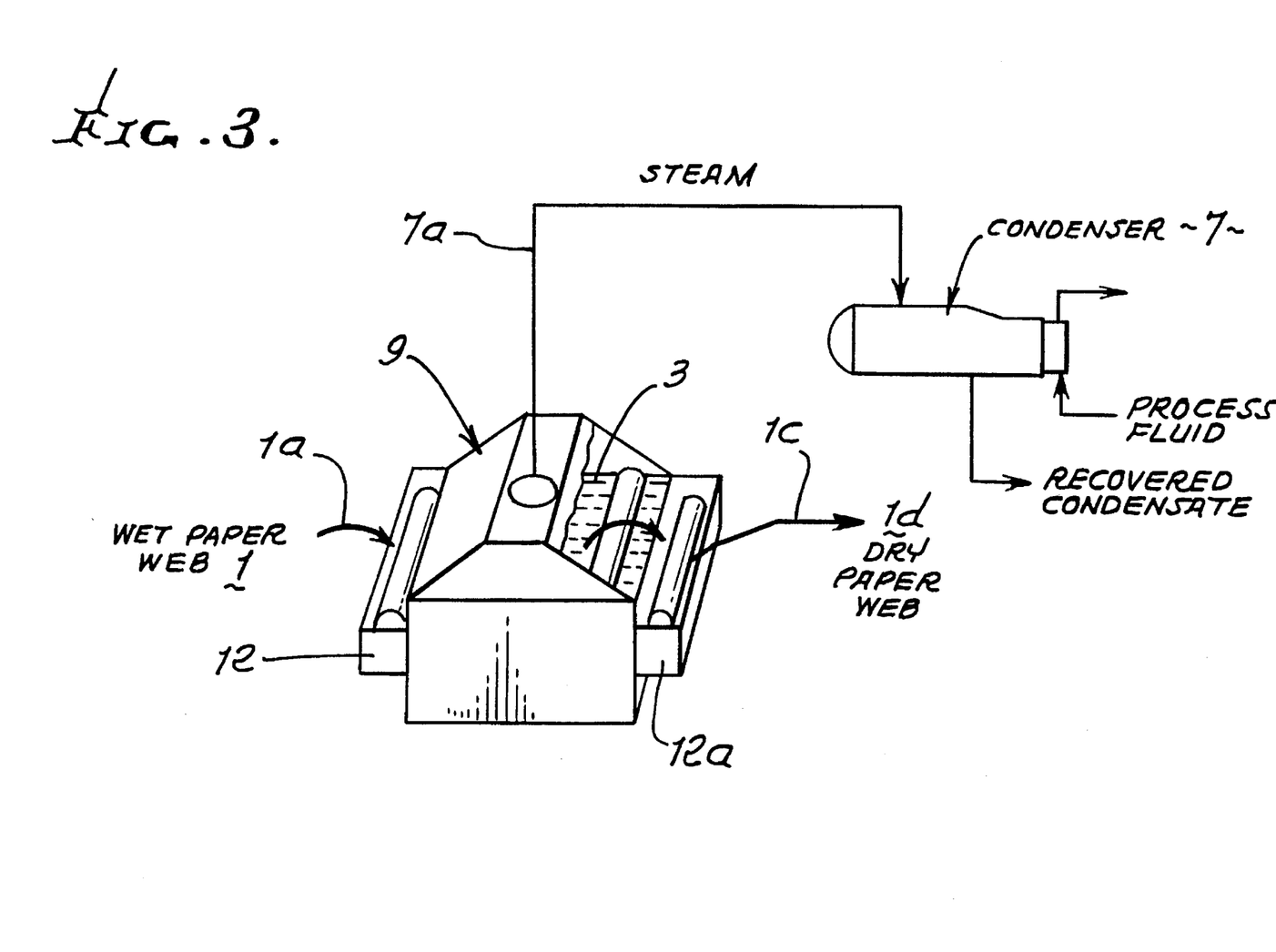
FIG. 3 depicts the method of steam recovery for the preferred invention embodiment.

When the paper web wetted by water is introduced into and travels within the molten fluid, such fluid contacts both sides of the web or sheet, which is rapidly heated from both sides to the ambient boiling temperature, and steam emanates from one or both surfaces of the paper web or sheet. The steam escapes in the form of bubbles from the molten bath to the surface of the latter, where it may be emitted to atmosphere, or collected by means of a hood 9, as seen in FIG. 3, so that it can be directed at 7a to a condenser 7. The steam can be contained or received within the hood by passing the wet paper web 1 through a barometric seal or trough 12 at the inlet to the bath, and a similar trough 12a at the outlet from the bath. The hood may cover the bath and serve to minimize contact between atmospheric oxygen and the molten fluid surface which might otherwise result in oxidation of the molten fluid.

The condenser 7 serves to recondense the moisture released from the water wet paper web during the molten contact drying process, and thereby recover the latent heat of the steam as waste heat, typically at or within temperature range of 90° C.–115° C. The condensed water can be reused elsewhere in the mill.

The paper web 1c exits the molten fluid bath or baths in a partially dry state or a completely dry state, depending on the contact time of the web with the molten bath, which is controlled by design. Due to the high interfacial surface tension between the molten fluid and the paper web fiber, the molten fluid does not appreciably stick to the surface of the paper.

Figure 4A:
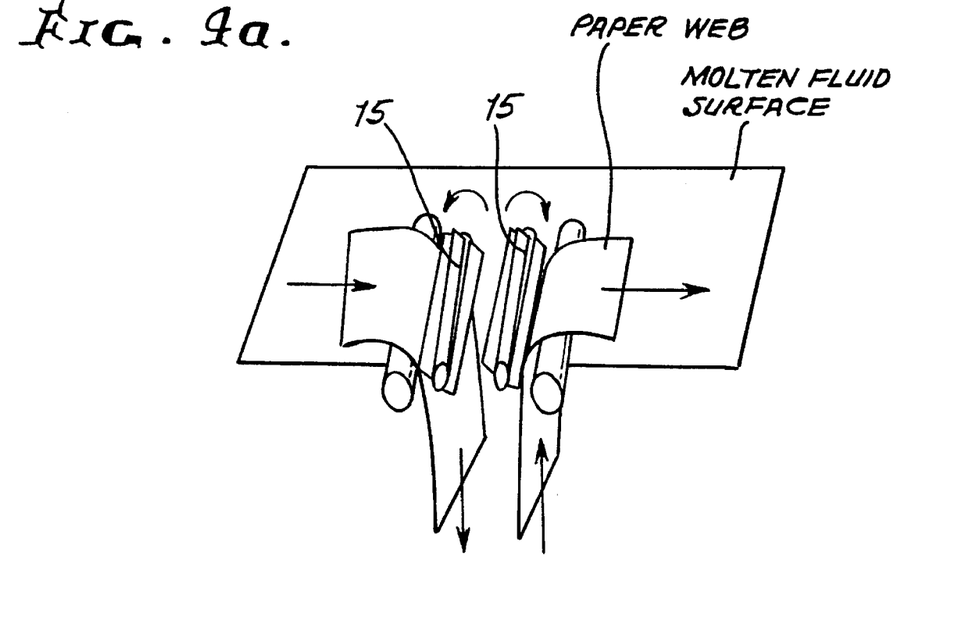
FIGS. 4a and 4b depict two methods for avoiding contact between surface layers of oxide scale, slag or dross, and the paper web at the entrance or exit location from the molten bath.

Oxide scale can form on the surface of some hot molten fluids when they are in surface contact with an oxygen-containing environment. This oxide scale may adhere to the paper web surface, if it comes in contact with the web at the points of web immersion into the bath and exit from the bath. Such oxide scale is easily cleared from the web surface by mechanical means, such as scrapers or sparge devices. To enhance the contact drying process and to prevent oxide scale from contact with the paper web, a finned bar 15 is placed on both sides of the paper web at the point of surface entry or exit, as shown in FIG. 4a. The finned bar rotates in a manner which sweeps the surface oxide scale or scum away from the paper at the point of surface contact, i.e., the loci of web entry into the bath and web exit from the bath.

Figure 4B:
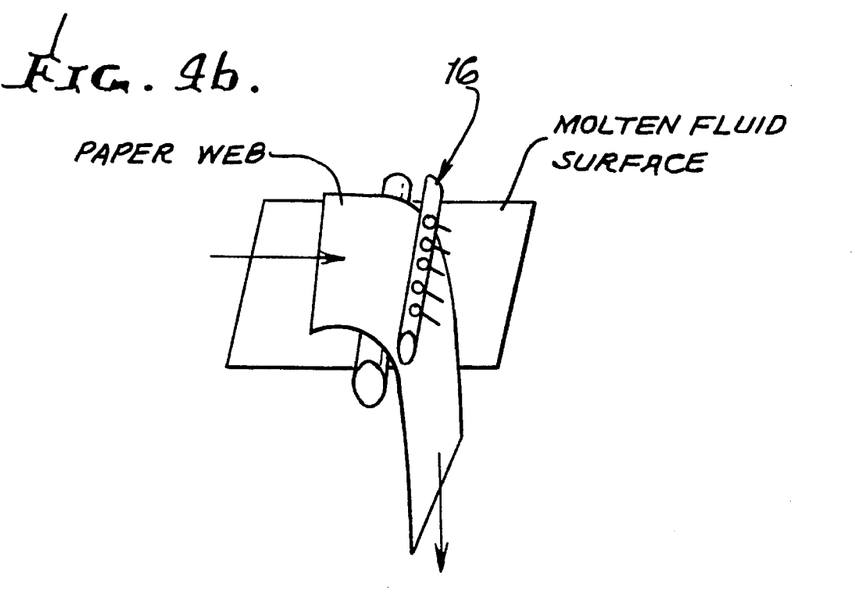

The invention contemplates use of other methods or means for sweeping away surface scale, including a steam sparge 16, as shown in FIG. 4b, and skimmers. The sparge employs a tube supplied with steam, which exits the tube via small holes to form jets which displace scale away from the web. The invention also includes use of inert blanketing agents, such as nitrogen, which displace oxygen from the surface of the molten fluid to substantially slow or mitigate the formation of oxide scale, slag or dross on the surface of the molten bath.

To further enhance the process, clean up rolls or brushes may be used to gently contact the paper web surface to remove foreign impurities, if any, which adhere to the paper at the exit of the molten bath.

The preferred embodiment of the invention contemplates the use of a range of molten fluid media, which are suitable candidates for the high-intensity drying process. These include low-melting point metal alloys and non-wetting fluorohydrocarbon-based fluids. The candidate molten fluids have melting points typically ranging from 60°–230° C.

For the preferred embodiment, the interfacial surface tension between the molten fluid heat transfer media and the fiber web must be sufficiently high to avoid sticking of the molten fluid to the web surface. The thermal conductivity of the molten fluid must also be sufficiently high to ensure that the molten fluid remains in a liquid state, at least during the final stages of drying, so that fluid does not solidify to form a film on the surface of the paper web.

When the thermal conductivity of the fluid is sufficiently high, the fluid conducts heat from the body of the molten bath to the surface contact region at the traveling web surface to ensure liquidity. The use of molten metal alloys is specifically preferred for this approach, due to their high interfacial surface tension with cellulose, and other fibrous materials, and due their high thermal conductivity.

Table 1 summarizes some estimated properties for several recommended molten metal eutectic alloy materials.

TABLE 1

Properties of Candidate Molten Materials

| Material | Melting Temperature (°C.) | Therm. Cond. k (Btu/ft2/h/F) | Spec. Heat Cp (Btu/lb/F) | Surface Tension (dyne/cm) |
| --- | --- | --- | --- | --- |
| In/Sn(52/48) | 118 | 19.6 | 0.060 | 580 |
| Bi/Pb(55/45) | 124 | 7.7 | 0.035 | 391 |
| Bi/Sn(58/42) | 138 | 11.6 | 0.046 | 447 |
| Sn/Pb(63/37) | 183 | 14.5 | 0.051 | 528 |
| Sn/Zn(92/8) | 199 | 20.0 | 0.061 | 594 |
| "Tin Foil" Sn/Cu(99/1) | 227 | 19.0 | 0.061 | 587 |

As seen in the above table, the eutectic metal alloys all exhibit high surface tensions against air and high thermal conductivities. It will be understood that those knowledgeable in the field that a wide range of molten materials can be usefully employed, and the invention is not limited to only those examples cited here.

As an illustration of the molten fluid contact drying process for drying paper, Table 2 summarizes the heat balance for a 500 ton/day (at reel) molten fluid contact dryer using a Bi/Sn alloy, operating at a 350° F. bath temperature, which is contacted against a sheet of 10 lb/1000 ft$^2$ basis weight paper entering the dryer at 180° F. The paper exits the molten bath at the ambient boiling point of 212° F.; and steam is assumed to exit the molten bath at 350° F.

TABLE 2

Molten Contact Drying Heat Balance For Bi/Sn Eutectic Alloy

| | |
| --- | --- |
| Paper Production at reel, ton/day | 500 |
| Web Basis Weight, lb/1000 ft$^2$ | 10 |
| Initial Web Moisture, wt. % | 58.5 |
| Final Web Moisture, wt. % | 5.0 |
| Metal Bath Temperature, °F. | 350 |
| Total Moisture Removed, lb/h | 53715 |
| Heat Input Required, MMBtu/h | 57.7 |

As seen in the example, the heat input to the molten contact dryer is 57.7 MMBtu/h. By comparison, the heat input to a conventional evaporative dryer for the same production capacity and product specifications would typically range from 67.0 MMBtu/h to 75.0 MMBtu/h. Therefore, the molten contact dryer is capable of reducing the dryer heat duty by 14% to 23%. These net savings exist because the molten contact dryer avoids the energy loss associated with heating ventilation air as required in the prior art.

Experimental tests were performed using a molten fluid contact drying apparatus consisting of a 14 inch diameter molten bath containing a 58 wt %/48 wt % Bi/Sn alloy filled to a depth of about three inches, and heated to a temperature of about 380° F. to 480° F. The molten bath was furnished with two rollers to guide the paper through the bath. The 1¼ inch diameter rollers were spaced at a center-to-center distance of about 6.5 inches. Prewetted 6 inches wide commercial kraft paper of 30# and 75# basis weight (lb/3000 ft$^2$) was fed through the bath at varying speeds.

The initial moisture content of the paper was calculated by measuring its weight before drying at each operating speed. The final moisture content was calculated by measuring the weight of the dried paper sample at the exit of the molten bath for each test run. By weight loss, the total evaporated moisture for each speed was calculated, and the drying rate was estimated, based on the contact time within the molten bath. A summary of the molten bath drying test runs using 6 inch kraft paper of 30# and 75# basis weight are shown in Table 3. Note that all moisture levels reported in this table are referenced to the "as-received" basis weight; and thus actually represent the difference in moisture between dried products and the as-received paper at ambient conditions.

The tests show that the paper can be dried at an average drying rate typically greater than 40/lb/ft$^2$/h when paper moisture levels are reduced below about 10 wt %. These measured drying rates are a factor of about 10 times higher than for conventional evaporative dryers based on total cylinder surface area when processing paper of a similar quality and final moisture content. By visual inspection, the tests show that no significant quantity of molten alloy adheres to the paper as it exits the bath. Scanning Election Microscopy (SEM) and Energy Dispensive X-Ray (EDX) analysis confirmed the absence of molten alloy particles or deposits on the surface of the dried paper.

The data indicates that a significant portion of the paper moisture is removed at contact times less than 0.5 seconds, where contact time is determined by travel time passing through the molten bath. This high rate of heat flux at short contact time is characteristic of the high-intensity drying process. The results suggest that the molten bath dryer is usable as a predryer, whereby partial drying of the paper is accomplished in an extremely compact apparatus with contact times of 0.2 to 0.5 seconds. The data also indicates that near complete moisture removal can be achieved for drying times of about 1.0–1.5 seconds. This result confirms the ability of the molten bath dryer to substantially replace a conventional dryer section with an apparatus of compact size.

The molten bath dryer is of further advantage in that the heat flux occurs from both sides of the paper, which appears to be unique. Heat imparted to both sides of the paper results in the generation of steam, which escapes from the top of the paper, when the paper travels a horizontal direction. Since steam generated from the lower side of the paper must travel up through the paper to reach the top surface, this steam expels internal moisture contained within the web. This dewatering effect is thought to further accelerate the drying process.

Note the experimental data in the following table:

TABLE 3

Experimental Data for Molten Fluid Contact Drying Tests Using Kraft Paper

| Linear Speed ft/min | Contact Time (Sec) | Moisture Loss lb/1000 ft2 | Final Moisture wt % | Drying Rate lb/ft2/h |
|---|---|---|---|---|
| 75# Kraft Paper: As-Received Paper Weight: 24.4 lb/1000 ft Nominal Bath Temperature: 380° F. | | | | |
| 11.24 | 3.559 | 15.02 | −1.88 | 15.20 |
| 29.95 | 1.336 | 14.36 | 7.69 | 38.70 |
| 29.95 | 1.336 | 15.46 | 3.66 | 41.67 |
| 41.32 | 0.968 | 13.35 | 8.17 | 49.64 |
| 59.14 | 0.676 | 14.10 | 10.03 | 75.09 |
| 105.71 | 0.378 | 11.59 | 7.22 | 110.38 |
| 105.71 | 0.378 | 10.22 | 9.32 | 97.33 |
| 75# Kraft Paper: As-Received Paper Weight: 24.4 lb/1000 ft Nominal Bath Temperature: 480° F. | | | | |
| 11.24 | 3.559 | 14.09 | 1.90 | 14.25 |
| 41.32 | 0.968 | 13.39 | 8.06 | 49.80 |
| 78.31 | 0.511 | 10.31 | 14.48 | 72.63 |
| 105.71 | 0.378 | 9.38 | 14.32 | 89.33 |
| 136.23 | 0.294 | 10.48 | 9.24 | 128.38 |
| 30# Kraft Paper: As-Received Paper Weight: 10.35 lb/1000 ft Nominal Bath Temperature: 380° F. | | | | |
| 12.90 | 3.101 | 17.54 | 12.13 | 20.35 |
| 26.60 | 1.504 | 15.31 | 12.19 | 36.64 |
| 37.00 | 1.081 | 12.73 | 23.67 | 42.39 |
| 48.00 | 0.833 | 10.78 | 32.72 | 46.59 |
| 30# Kraft Paper: As-Received Paper Weight: 10.35 lb/1000 ft Nominal Bath Temperature: 480° F. | | | | |
| 10.00 | 4.000 | 19.12 | −1.65 | 17.21 |
| 27.10 | 1.476 | 16.39 | 3.45 | 39.97 |
| 57.20 | 0.699 | 12.11 | 26.12 | 62.36 |
| 93.90 | 0.426 | 8.32 | 33.74 | 70.36 |

Figure 5:
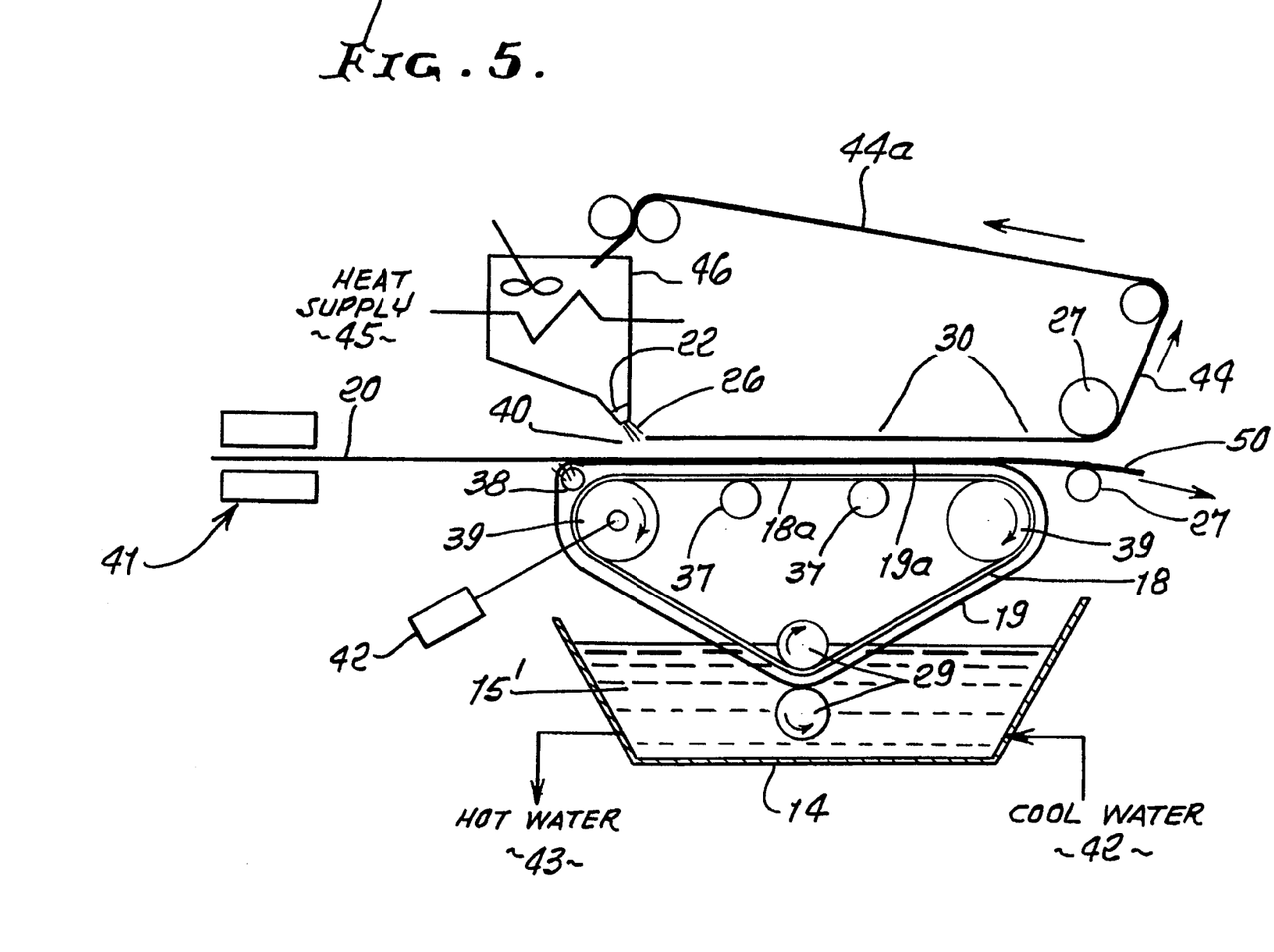
FIG. 5 is a schematic view of an alternate embodiment of the molten drying process and apparatus involving deposition of a molten film on the paper web surface, which solidifies and is recycled.

The molten film drying process and apparatus of FIG. 5 depicts an alternate embodiment of the present invention. A wet paper web 20 is layed upon rightwardly traveling upper section 19a of a cool, permeable or porous felt 19, which itself is applied to the outer surface of an impervious belt loop 18. The fiber web 20 travels rightwardly at the same rate as section 19a, and entrance zone 40 typically contains moisture levels in the range of 50–70 weight percent, after delivery from dewatering and pressing devices commonly employed within the industry and indicated at 41. The belt loop is entrained on rotating cylinders 39 which are mechanically driven at 42; and belt motion is translated to the felt and fiber web layers by means of applied tension, friction, and vacuum suction forces existent over all or part of the belt's traverse upper section 18a. The traveling belt at 18a, the overlaying felt at 19a, and the paper web 50 may be supported by a table rolls 37, or other mechanical means. The permeable felt 19 is voided of air by a flow of steam from a sparge pipe 38 just prior to contact with the underside of fiber web.

A hot, molten fluid 26 is directly applied to the moving fiber web immediately after the fiber web is contacted against the underlying felt. The molten fluid (for drying the web) is uniformly distributed over the fiber web upper surface from a variable orifice device or coating head 22. The molten fluid may be fed by gravity or under hydraulic pressure.

Upon contact with the fiber web, the surface of the molten fluid instantaneously solidifies at the web interface to form an impervious film which rests on and moderately adheres to the web. The molten fluid transfers heat to the fiber web, due to temperature driving forces, thereby causing progressive solidification within the applied film. At some point or zone 30 during the rightward conveyance period, the film is completely solidified over its entire thickness. Heat from the molten fluid causes the moisture in the fiber to boil, thereby releasing moisture as water vapor. The water vapor passes downwardly through the fiber web structure to its lower surface and then into the cool or cooler felt by virtue of a pressure gradient. The impervious, solidified film prevents water vapor from escaping the web through its upper surface.

The cool felt 19, being void of air, condenses the vaporized moisture at pressures below ambient. The vacuum pressure achieved within the felt corresponds to its saturation temperature, which typically ranges between 160°–190° F. As moisture is condensed, the latent heat of condensation is absorbed by the felt and the underlying belt 18. The heat capacity of the felt and belt are sufficient to prevent large temperature rises, which would limit the ability of the felt to condense moisture under vacuum. High felt heat capacities are easily achieved by increasing felt thickness and belt mass relative to the fiber web.

Beyond the end of the drying zone 30, the dried fiber web 50 is separated from the felt and belt. The felt and belt are then submerged in an aqueous condensate bath 151, which serves to cool the felt and belt. As the felt is submerged, it imbibes cool water contained in the tank 14. The tank is fed by a cool, fresh water source indicated at 42. Hot bath water is removed at 43. The tank water is thereby typically maintained at a temperature range of 140°–180° F. The felt is then compressed between compression rolls 29 in the bath to remove felt moisture. When pressure is released from the rolls, the felt imbibes additional cool moisture from the bath. This serves to ensure complete cooling of the felt, and this process can be repeated several times as needed. The cooled felt then returns to the zone adjacent to the steam sparge zone for air evacuation by means of steam flow from sparge pipe 38.

At the end of the solidification zone 30, the dried fiber web 50 is separated from the solidified film 44 by mechanical separation means, such as diverging cylindrical rolls 27, which are pre-threaded with the fiber web and the solidified film. The solidified film 44 is then traveled at 44a and discharged to a melting tank 46. The melting tank is heated from external sources 45 using steam or by combustion of fuel, and the melting may be aided by the recycling of hot, molten fluid using internal mixers.

The invention contemplates use of a range of molten fluid media, which are suitable for the molten film high-intensity drying process. These include low melting point metal alloys, molten sulfur, selected polymers, such as propylene, paraffin hydrocarbons and waxes, and a range of inorganic salts, such as $Mg(NO_3) \cdot 2H_2O$, $SnI_4$, magnesium laurate, copper acetate, and potassium acetate.

As an illustration of the use of molten films for high-intensity drying, Table 4 summarizes the performance for a 500 TPD drying operation (dry pulp basis) using a Sn/Pb alloy applied to a sheet of 10 lb/1000 ft² basis weight. The alloy is assumed to have a latent heat of fusion of 19.6 Btu/lb and is heated to an initial contact temperature of 500° F. and cooled to a final separation temperature of 275° F.

As seen in Table 4, a molten metal film thickness of 0.28 mm is applied to the paper web to supply the contact heat requirements for drying. Assuming that the molten metal is recycled in a continuous process having an inventory residence time of three minutes, a total metal inventory mass of 94,090 pounds is required.

TABLE 4

| Molten Film Drying Illustration For Sn/Pb Eutectic Alloy | |
|---|---|
| Pulp Throughput at reel, ton/day | 500 |
| Web Basis Weight, lb/1000 ft^2 | 10 |
| Initial Web Moisture, wt. % | 58.5 |
| Final Web Moisture, wt. % | 5.0 |
| Metal Density, lb/ft^3 | 521 |
| Metal Heat of Fusion, Btu/lb | 19.6 |
| Metal Heat Capacity, Btu/lb/F | 0.051 |
| Initial Metal Contact Temperature, F. | 500 |
| Final Metal Temperature, F. | 275 |
| Total Moisture Removed, lb/h | 53715 |
| Heat Input Required, MMBtu/h | 58.7 |
| Metal/Basis Pulp Weight, lb/lb | 47.5 |
| Metal Film Thickness, mm | 0.28 |
| Metal Inventory Residence Time, min. | 3 |
| Metal Inventory Mass, lb | 94090 |

Thus, it should be apparent to those skilled in the art that the subject invention accomplishes the objects set forth above. Although in this specification the preferred and alternate embodiments of the invention are described in detail, it is understood that the subject invention is not limited by the examples set forth herein, and that the scope of the invention includes all modifications, variations, and equivalent embodiments that fall within the scope of the attached claims.

In the above, the web or sheet typically consists of woven or unwoven fabrics or fibers selected from the group that includes Nylon, rayon, polyester, acrylic, cotton, silk, and wool.

The metallic material of the bath typically consists of an alloy selected from the group that includes:

i) Ga/In
ii) Bi/In
iii) In/Sn
iv) Bi/Pb
v) Bi/Sn
vi) Sn/Pb
vii) Sn/Zn
viii) Sn/Cu.

Also, the moist web is traveled in the molten bath for a residence time period less than three seconds, but greater than 0.5 seconds, and exits from the bath in essentially dried state.

I claim:

1. The method of drying a moist, fibrous web or sheet, which includes:

a) providing a molten metallic material at a temperature substantially above 100° C., b) and contacting the web or sheet with the molten material for a drying time period sufficient to cause partial or substantial removal of moisture from the web by heat transfer from the molten material, said drying time period being of relatively short duration.

2. The method of claim 1 including providing a bath formed by said molten material, and traveling the web or sheet in and relative to the bath to effect said contacting.

3. The method of claim 1 wherein said web or sheet consists of woven or unwoven fabrics or fibers selected from the group that includes Nylon, rayon, polyester, acrylic, cotton, silk, and wool.

4. The method of claim 2 wherein the web has an upper side and a lower side traveling in the bath, and web moisture is driven from the web upwardly from said upper side, into the bath above that upper side.

5. The method of drying a moist, fibrous web or sheet, which includes:
   a) providing a molten material at a temperature substantially above 100° C.,
   b) and contacting the web or sheet with the molten material for a drying time period sufficient to cause partial or substantial removal of moisture from the web by heat transfer from the molten material, said drying time period being of relatively short duration,
   c) there being a bath formed by said molten material, said contacting being effected by traveling the web or sheet in and relative to said bath,
   d) the web having an upper side and a lower side traveling in the bath, and web moisture is driven from the web upwardly from said upper side, into the bath above that upper side,
   e) and wherein moisture is driven from the web to form steam rising above the bath, and including collecting said steam condensing the steam for heat recovery.

6. The method of claim 5 including providing a hood extending over the bath, and for collecting the steam.

7. The method of claim 2 including circulating molten material into and out of the bath, for controlling bath temperature.

8. The method of claim 2 wherein the bath temperature is maintained at a level between 110° C. and 300° C.

9. The method of drying a moist, fibrous web or sheet, which includes:
   a) providing a molten material at a temperature substantially above 100° C.,
   b) and contacting the web or sheet with the molten material for a drying time period sufficient to cause partial or substantial removal of moisture from the web by heat transfer from the molten material, said drying time period being of relatively short duration,
   c) there being a bath formed by said molten material, said contacting being effected by traveling the web or sheet in and relative to said bath,
   d) the bath temperature being maintained at a level between 110° C. and 300° C.,
   e) and wherein the molten material includes metallic material.

10. The method of claim 2 wherein the molten material is selected from the following group:
    i) low melting point eutectic metal alloy
    ii) non-wetting fluorohydrocarbons.

11. The method of claim 1 wherein said web or sheet consists essentially of cellulose.

12. The method of claim 9 wherein said metal is an alloy selected from the group that includes:
    i) Ga/In
    ii) Bi/In
    iii) In/Sn
    iv) Bi/Pb
    v) Bi/Sn
    vi) Sn/Pb
    vii) Sn/Zn
    viii) Sn/Cu.

13. The method of claim 2 wherein the moist web is traveled in the molten bath for a residence time period less than three seconds, but greater than 0.5 seconds, and exits from the bath in essentially dried state.

14. The method of claim 13 wherein said residence time is between 0.75 and 2.5 seconds.

15. The method of claim 2 wherein the moist web is traveled in the molten bath for a residence period of less than 1.0 second and exits the bath in a partially dried state.

16. The method of claim 15 wherein said residence time is between 0.2 and 0.5 seconds.

17. The method of drying a moist, fibrous web or sheet, which includes:
   a) providing a molten material at a temperature substantially above 100° C.,
   b) and contacting the web or sheet with the molten material for a drying time period sufficient to cause partial or substantial removal of moisture from the web by heat transfer from the molten material, said drying time period being of relatively short duration,
   c) there being a bath formed by said molten material, said contacting being effected by traveling the web or sheet in and relative to said bath,
   d) and wherein impurities collect on a surface defined by the bath, and including the step of preventing contact with the web of said impurities.

18. The method of claim 17 wherein said impurities include slag, scale, or dross.

19. The method of claim 17 wherein said prevention step includes providing a steam jetting means oriented to jet steam at the impurities located proximate one or both of the following:
   — the locus of web entry into the bath
   — the locus of web exit from the bath.

20. The method of drying a moist, fibrous web or sheet, which includes:
   a) providing a molten material at a temperature substantially above 100° C.,
   b) and contacting the web or sheet with the molten material for a drying time period sufficient to cause partial or substantial removal of moisture from the web by heat transfer from the molten material, said drying time period being of relatively short duration,
   c) and including forming a film of said molten material on the web for residence thereon during said drying time period.

21. The method of claim 20 wherein molten material is selected from the following group:
    i) molten sulfur
    ii) polymer or polymers
    iii) inorganic salt or salts.

22. The method of claim 21 wherein the salt is selected from the group:
    $x_1$) $Mg(NO_3).2H_2O$
    $x_2$) $SnI_4$
    $x_3$) magnesium laurate
    $x_4$) copper acetate
    $x_5$) potassium acetate.

23. The method of claim 20 including traveling the web in a travel direction, and said film forming step includes depositing the molten material in film form on one side of the travel web, and returning said film from the web following said drying time period.

24. The method of claim 23 including providing a bath of said molten material which supplies said film, and to which the retrieved film is recycled.

25. The method of claim 23 including providing a traveling support for the web at the side thereof opposite said one side.

26. The method of claim 25 wherein said support includes a porous layer which is moist during a portion of its travel approaching the web.

27. The method of claim 26 wherein said support includes an impervious, traveling belt, said porous layer carried by said belt.

28. The method of claim 27 including jetting steam at said porous layer approaching the web, to expel and remove at least some air from said layer, whereby said layer will absorb moisture driven from the web by heat transfer into the web from said film, and create a vacuum to compress the web against said porous layer.

29. The method of claim 26 wherein said layer consists of felt or woven fabric.

30. The method of claim 20 wherein the film is applied to the web in molten state, and retrieved from the web in solidified state.

* * * * *